(12) United States Patent
Kaseva et al.

(10) Patent No.: US 12,464,529 B2
(45) Date of Patent: Nov. 4, 2025

(54) CONFIGURATION SYSTEM FOR A WIRELESS COMMUNICATION NETWORK

(71) Applicant: WIREPAS OY, Tampere (FI)

(72) Inventors: Ville Kaseva, Tampere (FI); Ville Juven, Porttikatu (FI); Hannu Hirvi, Tampere (FI)

(73) Assignee: WIREPAS OY, Tampere (FI)

( * ) Notice: Subject to any disclaimer, the term of this patent is extended or adjusted under 35 U.S.C. 154(b) by 711 days.

(21) Appl. No.: 17/806,760

(22) Filed: Jun. 14, 2022

(65) Prior Publication Data
US 2022/0408432 A1  Dec. 22, 2022

(30) Foreign Application Priority Data
Jun. 16, 2021 (FI) .................................... 20215710

(51) Int. Cl.
*H04W 72/21* (2023.01)
*H04W 24/02* (2009.01)
(Continued)

(52) U.S. Cl.
CPC .......... *H04W 72/21* (2023.01); *H04W 24/02* (2013.01); *H04W 84/042* (2013.01); *H04W 84/18* (2013.01)

(58) Field of Classification Search
CPC ... H04W 84/18; H04W 84/042; H04W 24/02; H04W 72/21
See application file for complete search history.

(56) References Cited

U.S. PATENT DOCUMENTS 7,471,636 B2 * 12/2008 Vasseur .................. H04L 12/56
370/242
8,942,212 B2 * 1/2015 Yamada ................ H04W 48/14
370/310
(Continued)

FOREIGN PATENT DOCUMENTS

GB          2457649 A     8/2009
WO     2018/194390 A1    10/2018

OTHER PUBLICATIONS

European Search Report, EP Pat. App. 22178795, mailed Oct. 20, 2022 (2 pages).
(Continued)

*Primary Examiner* — Hassan A Phillips
*Assistant Examiner* — Prenell P Jones
(74) *Attorney, Agent, or Firm* — Thomas Horstemeyer, LLP

(57) ABSTRACT

The application relates to a configuration system (100) for a wireless communication network (102) that comprises at least one first communication device (104*b*) and at least one second communication device (104*c*). The at least one first and second communication devices (104*b*, 104*c*) belong to a plurality of communication devices (104, 104*a*, 104*b*, 104*c*, 104*d*). Each communication device (104, 104*a*, 104*b*, 104*c*, 104*d*) in the plurality of the communication devices is a radio node device configured to provide a bi-directional radio communication with at least one of the plurality of the communication devices. After receiving (220) a content of a network persistent configuration data (CO) from a communication device (104*a*) belonging to the plurality of the communication devices and storing (222) the received content of the configuration data, each first communication device (104*b*) is configured to broadcast (224) a configuration data description (DE), which comprises a version identifier (VE) of the configuration data, periodically in the
(Continued)

Fig. 2A network for indicating a capability of said first communication device to send (228) the stored content of the configuration data, which is in accordance with the version identifier, on request.

17 Claims, 3 Drawing Sheets

(51) Int. Cl.
*H04W 84/18* (2009.01)
*H04W 84/04* (2009.01)

(56) References Cited

U.S. PATENT DOCUMENTS

| | | | | |
|---|---|---|---|---|
| 9,819,548 | B2* | 11/2017 | Donner | H04L 41/16 |
| 10,548,068 | B2* | 1/2020 | Lee | H04W 36/035 |
| 10,972,342 | B2* | 4/2021 | Shenoy | H04L 41/0895 |
| 12,127,272 | B2* | 10/2024 | Hwang | H04B 17/318 |
| 2006/0187916 | A1* | 8/2006 | Vasseur | H04L 12/56 |
| | | | | 370/389 |
| 2009/0247151 | A1* | 10/2009 | Kameyama | H04L 67/04 |
| | | | | 455/426.1 |
| 2010/0080206 | A1 | 4/2010 | Yamada | |
| 2014/0215028 | A1* | 7/2014 | Donner | H04L 41/16 |
| | | | | 709/220 |
| 2015/0074737 | A1* | 3/2015 | Dua | H04N 21/440218 |
| | | | | 725/110 |
| 2017/0223615 | A1 | 8/2017 | Lee et al. | |
| 2018/0070222 | A1* | 3/2018 | Narang | G08B 25/001 |
| 2019/0208512 | A1* | 7/2019 | Hirvi | H04W 4/06 |
| 2020/0195501 | A1* | 6/2020 | Shenoy | H04L 41/0894 |
| 2021/0068032 | A1 | 3/2021 | Colliaux et al. | |
| 2024/0362994 | A1* | 10/2024 | Daoura | G08C 17/02 |

OTHER PUBLICATIONS

ERICSSON: Index Based Provisioning of System Information in JR, 3rd Generation Partnership Project (3GPP), Moble Competence Center, Spokane, USA—Jan. 17-19, 2017 (4 pages).
Finish Patent App. No. 20215710, Search Report, mailed Apr. 2, 2022 (2 pages).

* cited by examiner

CONFIGURATION SYSTEM FOR A WIRELESS COMMUNICATION NETWORK

CROSS REFERENCE TO RELATED APPLICATION

This application claims priority to and the benefit of Finnish national patent application number 20215710, filed on Jun. 16, 2021, the entire contents of which is hereby incorporated herein by reference.

TECHNICAL FIELD

The application relates generally to a configuration system for a wireless communication network.

BACKGROUND

A wireless mesh network requires various network-wide configuration data, such as device and connectivity management data. The configuration data is used to configure e.g. a communication protocol, application layer, or both. The configuration data originates from outside the mesh network and it is commonly configured from a back end system that locates outside the mesh network.

The configuration data is possible to sent as unsolicited push messages via a gateway device and its mesh interface to the mesh network. It is possible to communicate in the mesh network by using a routed approach or a broadcast approach, where each node repeats the message comprising the configuration data numerous times.

The unsolicited push method has certain drawbacks such as the messages may be lost in a multi-hop path, e.g. due to bad links, and the gateway device has no possibility to be aware of such lost. This bad link drawback can be mitigated with end-to-end acknowledgement messages and re-transmissions. Additionally, nodes may not be connected all the time, e.g. due to temporal loss of connectivity due to link breakages, re-routing, or other network maintenance tasks, whereupon this results in lost downlink messages for these nodes. This connectivity drawback can be mitigated with long buffering times for messages and end-to-end acknowledgement messages and re-transmissions.

The configuration data is also possible to configure via solicited poll messages, where a node requests the configuration data from the gateway device in the solicited multi-hop poll method or from a neighbor node in the solicited single-hop poll method. The gateway device or the neighbor node responds with the message comprising the configuration data. The gateway device may ask the configuration data from the backend or it may use a locally stored copy of the configuration data to serve the request from the mesh network in the solicited multi-hop method.

The unsolicited push and solicited poll methods are usually used in combination, e.g. the unsolicited push method is used when the configuration is updated to nodes in the mesh network and the solicited poll methods are used when a new node, which joins the mesh network, acquires the configuration data.

The solicited multi-hop poll method has drawbacks such as it requires multi-hop communication, which consumes power and bandwidth resources of multiple nodes in the mesh network, in the multi-hop routing path and causes load in the large extent of the network. The solicited single-hop poll method, for its part, requires the unsolicited push method in order to update the configuration data.

SUMMARY

An object of the invention is to withdraw the above-mentioned drawbacks of known configuration solutions and to provide an efficient and robust method for distributing a configuration data to node devices in a wireless mesh network. Additionally, this versatile, reliable method is agnostic to a distributed, actual content of the configuration data.

An object of the invention is fulfilled by providing the configuration system, wireless communication device, configuration methods, computer program, and computer-readable storage medium according to the independent claims.

Embodiments of the invention are specified by the configuration system, wireless communication device, configuration methods, computer program, and computer-readable medium according to the independent claims.

A configuration system for a wireless communication network comprises at least one first communication device and at least one second communication device. The at least one first and second communication devices belong to a plurality of communication devices. Each communication device in the plurality of the communication devices is a radio node device configured to provide a bi-directional radio communication with at least one of the plurality of the communication devices. After receiving a content of a network persistent configuration data from a communication device belonging to the plurality of the communication devices and storing the received content of the configuration data, each first communication device is configured to broadcast a configuration data description, which comprises a version identifier of the configuration data, periodically in the network for indicating a capability of said first communication device to send the stored content of the configuration data, which is in accordance with the version identifier, on request.

A first configuration method for a wireless communication network comprises a following step of presenting at least one first communication device and at least one second communication device belonging to a plurality of communication devices operating as radio node devices. The method further comprises a step of providing, by each communication device in the plurality of the communication devices, a bi-directional radio communication with at least one of the plurality of the communication devices. The method further comprises, after receiving a content of a network persistent configuration data from a communication device belonging to the plurality of the communication devices and storing the received content of the configuration data, a step of broadcasting, by each first communication device, a configuration data description, which comprises a version identifier of the configuration data, periodically in the network for indicating a capability of said first communication device to send the stored content of the configuration data, which is in accordance with the version identifier, on request.

A wireless communication device for distributing a configuration data in a wireless communication network comprises a controller and a radio communicator for operating as a radio node device in the previous configuration system. The radio communicator is configured to provide a bi-directional radio communication with at least one of plurality of the communication devices. After receiving a content of a network persistent configuration data from other communication device belonging to the plurality of the communication devices and storing the received content of the configuration data, the radio communicator is configured to broadcast a configuration data description, which comprises a version identifier of the configuration data, periodically in the network for indicating a capability of said communication device to send the stored content of the configuration data, which is in accordance with the version identifier, on request.

A second configuration method for distributing a configuration data in a wireless communication network comprises a following step of providing, by a radio communicator of a wireless communication device operating as a radio node device, a bi-directional radio communication with at least one of plurality of the communication devices. The method further comprises, after receiving a content of a network persistent configuration data from other communication device belonging to the plurality of the communication devices and storing the received content of the configuration data, a step of broadcasting, by the radio communicator, a configuration data description, which comprises a version identifier of the configuration data, periodically in the network for indicating a capability of said communication device to send the stored content of the configuration data, which is in accordance with the version identifier, on request.

A computer program comprises instructions, which, when the computer program is executed by a computer, which is in accordance with the previous device, cause the computer to carry out at least the steps of the previous second method.

A tangible, non-volatile computer-readable storage medium comprises the computer program, which is in accordance with the previous computer program.

BRIEF DESCRIPTION OF THE FIGURES

The embodiments are explained below with reference to the following figures.

DETAILED DESCRIPTION OF THE FIGURES

Figure 1:
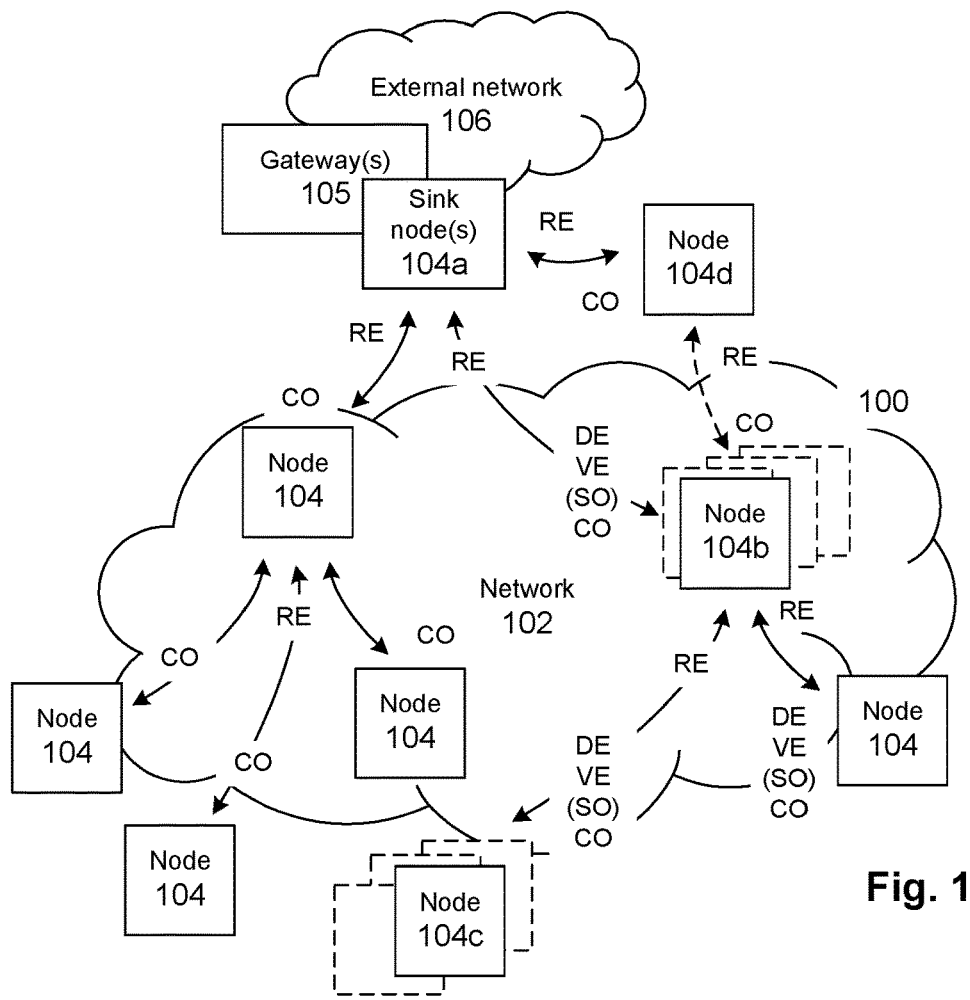
FIG. 1 presents a configuration system in a wireless communication environment

FIG. 1 presents a configuration system 100, which operates in a wireless communication environment.

The environment comprises a wireless radio communication network (system) 102, which comprises a plurality of wireless radio communication devices (nodes) 104. The devices 104 operate on a same spectrum at a same geographical area, e.g. within the presented environment. The use of same spectrum enables a bi-directional radio communication between the devices 104 in the network 102, whereupon radio transmissions transmitted by one device 104 may be received by another device 104 and vice versa.

The system 100 may be applied to any wireless radio communication network 102 that uses in packet transmissions in the communication. The system 100 may be applied in wireless communication networks 102 complying Digital European Cordless Telecommunications (DECT-2020) standard. Some non-limiting examples to which the system 100 may also be applied may comprise, but is not limited to, a Bluetooth Low Energy (BLE) mesh network, a Zigbee network, a Thread network, a Public Land Mobile Network (PLMN), a Wireless Local Area Network (WLAN), a Low Power Wide Area Network (LPWAN), a cellular based local area network, a cellular network, a wireless multi-hop network, or a wireless mesh network, e.g. wireless sensor network, and/or any other wireless networks.

The devices 104 are capable to receive transmissions with one radio technology, e.g. BLE transmissions or WLAN transmissions, which all transmissions are from the same network 102. However, at least one of the devices 104, e.g. one, two, three, four, or more devices, may be capable to receive transmissions with at least two radio technologies, e.g. BLE transmissions and WLAN transmissions, which all transmissions are all from the same network 102.

Some of the devices 104 are later on referred as devices 104a, 104b, 104c, 104d in order to explain the single-hop and multi-hop communication between the devices 104 explicitly. These devices 104a, 104b, 104c, 104d however correspond with the devices 104.

The DECT-2020 standard is a radio access technology developed by ETSI. The DECT-2020 supports massive machine-type communication (mMTC) and ultra-reliable low latency communication (URLLC). On Physical (PHY) layer, the key technology components of the DECT-2020 are Orthogonal frequency-division multiplexing (OFDM), adaptive modulation and coding schemes (MCS), Modern Channel coding methods (Turbo, LDPC, Convolutional coding), HARQ for both scheduled and contention based transmissions, and a support of multi-antenna transmissions with different Multiple-Input and Multiple-Output (MIMO) streams. On Medium access (MAC) layer and from system aspects, the key technology components of the DECT-2020 are a support of high number of Internet of Things (IoT) sensors, actuators, and other industrial applications; support of Mesh network topology, support of URLLC communication with very short delay (typical application may be wireless microphones); operation on frequencies that are license exempt; and support of multiple overlapping non-coordinated networks with cognitive radio capabilities to share spectrum resources between multiple networks.

The system 100 is used for obtaining and distributing (disseminating) a network persistent configuration data (network persistent data, NPD, configuration data) CO, which comprises data items for different configuration and management entities inside the device 104, in the network 102.

The system 100 is explained mainly by using three devices 104a, 104b, 104c, which belong to the system 100, operate in the network 102 and form a group of devices 104a, 104b, 104c. The network 102 may also comprise a plurality of other devices 104, which also participate to a formation of said group, whereupon the group comprises devices 104, 104a, 104b, 104c.

As above has been explained, each device 104 is able to provide, by means of its radio communicator 436, the bi-directional radio communication with at least one other device 104. This means that each device 104 may operate as a transmitter, as a receiver, or as a transmitter-receiver when each device 104 is able to transmit at least one message DE, RE, CO to other device(s) 104 and to receive at least one message DE, RE, CO from the other device(s) 104 in the network 102.

The system 100 also comprises at least one gateway device 105, e.g. one, two, three, four, or more gateway devices. Each gateway device 105 operates as a gateway between the network 102 and other external network(s) 106, e.g. Internet, and delivers data in the network 102 and from the network 102. Each gateway device 105 communicates with at least one sink device (node) 104a, e.g. one, two, three, four, or more sink devices, and each sink device 104a operates as a radio interface for the gateway device 105 in the network 102. Each sink device 104a may locate physically in connection with the gateway device 105 or separately in a different part of the network 102. If the gateway 105 comprises several sink devices 104a, one may locate in connection with the gateway device 105 and others separately in different parts of the network 102.

The sink device(s) 104a is a fixed router device (router), but other node devices 104 are able to operate in different fixed or non-fixed roles in the network 102. The other devices 104 in the system 100 are router devices and non-router devices (non-routers) depending on whether a device 104 needs to participate in data forwarding. One method for selecting router and non-router roles may be e.g. in accordance with the method explained in patent publication U.S. Pat. No. 10,499,264.

Each router device 104 maintains a connectivity of the system 100 and routes (forwards) data of other devices 104 when necessary. Each non-router node 104 is able to provide a bi-directional communication in order to transmit its own data and to receive data directed for it similarly as sink and router devices 104, but the non-router device 104 does not route data of other devices 104. Each of devices 104 is able to operate at least as a router or non-router device.

The system 100 comprises the devices 104 so that all devices 104 are not able to communicate directly with the sink device(s) 104 (gateway device(s) 105) due to extensive distance between the devices 104 and limited radio range, whereupon it is necessary to use multi-link (multi-hop) communication between each device 104 and the sink device 104.

Figure 2A:
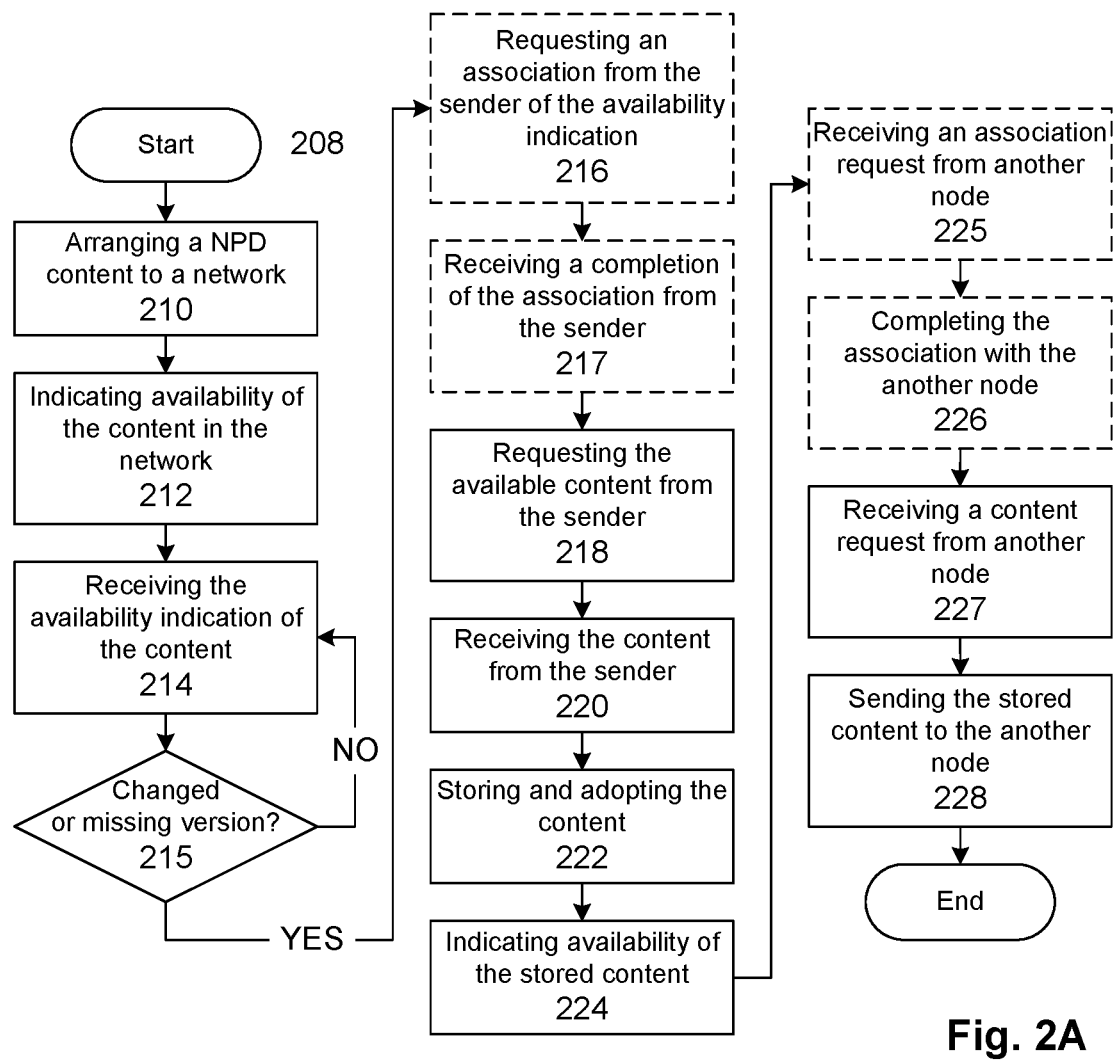
FIG. 2A-2B present a flowchart of a configuration method and a principle of a multi-hop communication

FIG. 2A presents a configuration method 208 for obtaining and distributing the (first) configuration data CO in the above explained system 100. The method 208 is explained by using one backend system (device) with one gateway device 105 and said one gateway device 105 with one sink device 104a, but the system 100 may additionally have at least one other backend system, e.g. one, two, three, four, or more other backend systems and each backend system may communicate with at least one gateway device 105 including said one gateway device 105. The system 100 may additionally comprise at least one other gateway device 105, e.g. one, two, three, four, or more other gateway devices and each gateway device 105 may comprise at least one sink device 104a, e.g. one, two, three, four, or more sink devices, including said one sink device 104a.

The backend system is an external control system, monitor system, or both, and it may be implemented in a high computing capacity computer. Alternatively, the backend system may be implemented lightly in a mobile device (phone), which communicates with the gateway device(s) 105 or directly with one of devices 104, 104a, 104b, 104d by using a radio interface of the network 102 or another radio interface, e.g. BLE or Radio Frequency IDentification (RFID) interface, for delivering the content of the configuration data CO into the network 102. In the case of such arrangement, the mobile device may also have a connection to a high computing capacity computer, whereupon it operates as a gateway device 105.

At step 210, the gateway device 105 in the system 100 receives a message, which comprises a content of the configuration data CO, from outside the network 102. The configuration data CO is configured by the backend system of the system 100, which is in the external network 106. If the system 100 has several backend systems, each backend system manages a dedicated operation of the network 102 or a dedicated application and sends the operation or application related configuration data CO to the network 102.

The configuration data CO may comprise e.g. Internet Protocol version 6 (IPv6) configuration information, IPv6 over Low-Power Wireless Personal Area Network (6LoWPAN) configuration information, Dynamic Host Configuration Protocol (DHCP) information, Domain Name System (DNS) information, service, server, or both information; public key or digital certificates; software-update control information, software image(s), or software-related metadata; security keys, security key lists, or security-key related metadata; or other configuration or management information that is used by a communication protocol (stack), e.g. transmit configuration information such as a maximum allowed transmission (TX) power in the network 102; application, or other internal component of the communication device 104.

The IPv6 configuration information comprises e.g. at least one IPv6 network or subnet prefix of variable length. The prefix information provides to communication devices 104 information of prefix(es) used in the network 102 (on-link or on-mesh prefix) and prefix(es) used for IPv6 stateless address auto-configuration (SLAAC). Information of a prefix may be augmented with at least one of on-link flag, autonomous address configuration flag, valid lifetime field, and preferred lifetime field relating to the prefix. The IPv6 configuration may further comprise information about e.g. Maximum Transmission Unit (MTU) that should be used by the Internet Protocol (IP) layer.

The 6LoWPAN configuration information comprises e.g. at least one IPv6 header compression context, where a single context comprises a context identifier (CID) and a context prefix, which may be IPv6 network or subnet prefix of variable length or a full IPv6 address. Additionally, the context may comprise a compression flag, a valid lifetime field relating to the specific CID and prefix, or both.

The DHCP information comprises e.g. at least one DHCP server address, availability information of IPv6 address(es) via DHCP (managed address configuration flag), availability information of other configuration information via DHCP (other configuration flag), or other DHCP related information.

The DNS information comprises at least one of e.g. at least one DNS server address, at least one DNS AAAA records mapping hostname to IPv6 addresses, and other DNS related content or records.

The information of the IPv6 configuration, 6LoWPAN configuration, DHCP, and DNS is in a format specified in the related Internet Standards and Request for Comments (RFCs) or in other format, e.g. a size-optimized format.

The public key or digital certificates comprise at least one of e.g. at least one root or Certificate Authority (CA) certificates; at least one intermediate certificate or a certificate chain; and at least one leaf certificates, e.g. at least one of DTLS client, TLS client, server certificates, and code signing certificates. The information is in the format specified in the related Internet Standards and Request for Comments (RFCs), e.g. X.509, or in other format e.g. the size-optimized format.

The service and server information comprise e.g. at least one server address, at least one hostname, at least one service UDP ports, at least one TCP ports, at least one service identifier (ID), at least one name to identify at least one of e.g. an application server and service; and a device management server and service.

The software update control information may comprise e.g. at least one of a version of a software or firmware that is distributed in the network 102, if the software or firmware is allowed to be distributed, to be taken into use, or both in the network 102 and in communication devices 104; the time when the new software or firmware should be taken into use, and other identifiers of the software or firmware, e.g. Cyclic Redundancy Check (CRC) or Message Integrity Code (MIC).

The software image comprises e.g. at least one software or firmware image that should be distributed to the network 102 and taken into use in the network 102 at some point. Additionally, the software image may comprise the software or at least one image in plaintext or in encrypted format, and metadata, e.g. at least one of the version of the software or firmware; encryption method, software signing method and signature; and MIC. Additionally, the software image may comprise a software or firmware for at least one of an application, communication protocol, and other component inside a communication device 104.

The security keys or security key lists comprises e.g. at least one of at least one security key to secure network communications inside the network 102, at least one security key for securing an end-to-end communication, e.g. from a communication device 104 to the external backend system; at least one application security key, and metadata, e.g. at least one of at least one key index, key rotation policy or times to take new keys into use; and key revocation information.

The configuration data CO is in plaintext, encrypted, or partly in plaintext and partly encrypted, and it may be secured by at least one digital signature, at least one MIC, or both.

The backend system sends the configuration data CO unsolicitedly without any request from the gateway device 105, from one of the devices 104, 104a, 104b, 104d through the gateway device 105, or from one of the devices 104, 104a, 104b, 104d directly. Alternatively, the backend system may send the configuration data CO solicitedly as a response to a request message sent by the gateway device 105, by one of the devices 104, 104a, 104b, 104d through the gateway device 105 or by one of the devices 104, 104a, 104d directly.

At step 212, after the reception of the configuration data CO, the sink device 104a stores, by means of its controller 430, the content of the configuration data CO in its memory 434 so that it can distribute the stored configuration data CO on request. Then, the sink device 104a identifies, by means of its controller 430, whether the content of the received configuration data CO comprises completely, partly, or none relevant payload(s) (part(s)) for it and adopts, by means of its controller 430, the identified relevant payload(s) of the received configuration data CO, if such exists.

Additionally, the gateway device 105 may receive another (second) message, which comprises a content of another configuration data CO, from another backend system outside the network 102. The contents of the configuration data CO and another configuration data CO relate to different purposes. After the reception of the another configuration data CO, the sink device 104a stores, by means of its controller 430, the content of the another configuration data CO in its memory 434 for distributing it on request and identifies, by means of its controller 430, whether the content of the another configuration data CO comprises completely, partly, or none relevant payload(s). Then, the sink device 104a adopts, by means of its controller 430, the identified relevant payload(s) of the another configuration data CO, if such exists. If the sink device 104a receives multiple different configuration data CO for different purposes, it operates similarly as in the case of single configuration data CO in relevant steps 212, 214, 215, 216, 217, 218, 220 of method 208 as below has been explained, whereupon the system 100 may distribute multiple different configuration data CO parallelly from each sink device 104a (local source).

Additionally, the gateway device 105 may comprise at least one other sink device 104a, which is configured to distribute a content of a different (third) configuration data in the network similarly as the sink device 104a and the another sink device 104a.

Then, the sink device 104a generates, by means of its controller 430, a description DE of the configuration data CO, which comprises a version identifier VE that identifies a (new) version of the configuration data CO, in order to indicate availability of the configuration data CO.

Additionally, the generated configuration data description DE may comprise a source identifier SO of the configuration data CO that identifies a source of the configuration data CO, e.g. an address of the sink device 104a that distributes the configuration data. The source identifier SO may specify locally each sink device 104a, which distributes the configuration data CO into the network 102, e.g. by a device address of the sink device 104a.

Additionally, the sink device 104a includes, by means of its controller 430, the configuration data description DE as a part of a beacon message.

The beacon message comprises information for devices 104 in the network 102 and it is typically broadcasted for all devices 104 within the radio range. In this method 208, each device 104, which operates as a sink or router device, is configured to send beacon messages.

Figure 3A:
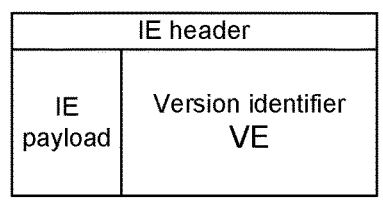
FIG. 3A-3C present example formats of information elements for configuration data description and content messages
Figure 3B:
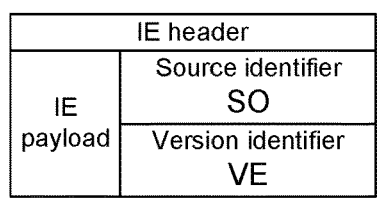

FIG. 3A an 3B present the example formats of the information element IE for the configuration data description DE, which is included in the beacon message in this and following relevant method steps.

The information element IE comprises at least a header field, which identifies a type of the information element, in this case the configuration data description DE, and a payload field, which identifies at least the version identifier VE that identifies whether a receiver device 104 of the configuration data description DE should request a new content of the configuration data CO from a sender device 104 of the configuration data description DE. The version identifier VE may be e.g. a sequence number, sequence identifier, or other identifier, which identifies the version of the configuration data CO. The payload field may also identify the source identifier SO that identifies a source (origin, source address, source device) of the content of the configuration data CO.

Then, at step 212, the sink device 104a, which operates in the example as a (local) source, broadcasts (sends), by means of its radio communicator 436, the beacon message comprising the configuration data description DE periodically in order to inform (advertise) in the system 100 that the stored configuration data CO is available on request and, at the same time when necessary, in order to initiate an association with other device 104, 104b, 104c, 104d on request.

At step 214, the (first) device 104b, which operates as a router device in this example, receives, by means of its radio communicator 436 the broadcasted beacon message. The configuration data description DE may also be received by other devices 104 in the network 102, whereupon the device 104b is not an only receiver but one of a plurality of receiver devices 104. In both cases, each receiver device 104, 104b, which is a router device, operates independently and similarly in accordance with the following communication between the devices 104*a*, 104*b*. The operation of non-router devices 104, 104*b* is explained later on.

At step 215, the device 104*b* identifies, by means of its controller 430, from received configuration data description DE whether the device 104*b* lacks a stored version identifier VE, which means that the device 104*b* does not have the configuration data CO, or its stored version identifier VE differs from the version identifier VE in the beacon message, which means that the device 104*b* has an old version of the configuration data CO. Additionally, if the received message comprises the source identifier SO, the device 104*b* also identifies, by means of its controller 430, whether the device 104*b* lacks a stored source identifier SO, which means that it does not have a stored configuration data CO, or the stored source identifier SO differs from the source identifier SO in the beacon message. The identification is carried out by comparing the received identifier(s) VE, SO to the stored respective identifier(s) VE, SO in the memory 434 of the device 104*b*, if the device 104*b* has the respective identifier VE, SO as stored.

If the version identifier VE is unchanged or both identifiers VE, SO, when the beacon message comprises also the source identifier SO, are unchanged on the grounds of the identification, the device 104*b* has no need to update its configuration data CO and it continues to operate as previously at step 214.

If the identification at step 215 indicates that the version identifier VE is changed or missing, or at least one of the identifiers VE, SO, when the beacon message comprises also the source identifier SO, is changed or missing, the method 208 continues at step 216 or at step 218 depending on whether the device 104*b* is a part of the network 102 or not, and whether the configuration data distribution is included (integrated) in the association communication (procedure) or not.

At step 216, if the device 104*b* is not a part of the network 102 and the association and distribution communications are separate, the device 104*b* generates, by means of its controller 430, an association request (message) in order to request the association to the network 102 (and to the sink device 104*a*) and sends, by means of its radio communicator 436, the association request to the sink device 104*a*.

At step 217, the sink device 104*a* receives, by means of its radio communicator 436, the association request and generates, by means of its controller 430, an association acknowledged response (message). Then, the sink device 104*a* sends, by means of its radio communicator 436, the generated response to the device 104*b* in order to complete the association between the devices 104*a*, 104*b*.

Alternatively, the association procedure between the devices 104*a*, 104*b* may comprise more communications than above has been explained when the association procedure is completed. This also concerns other association procedures explained later on.

At step 218, if the device 104*b* is already a part of the network 102, the device 104*b*, which lacks the configuration data CO, has the old version of the configuration data CO, or has different source identifier SO, generates, by means of its controller 430, a configuration data request RE in order to request the actual content of the available configuration data CO from the sink device 104*a*. Alternatively, the configuration data distribution may be included in the association communication, whereupon at step 218, if the device 104*b* is not a part of the network 102, the device 104*b* may include, by means of its controller 430, the generated configuration data request RE as a part of the association request.

Then, the device 104*b* sends, by means of its radio communicator 436, the request message, which has been generated at step 218, to the sink device 104*a*.

At step 220, the sink device 104*a* receives, by means of its radio communicator 436, the configuration data request RE or the association request, which comprises the configuration data request RE, from the device 104*b*.

If the sink device 104*a* received the configuration data request RE, it generates, by means of its controller 430, a message comprising the content of the configuration data CO in order to send the actual content of the configuration data CO to the device 104*b* as a response. Alternatively, if the sink device 104*a* received the association request, it includes, by means of its controller 430, the content of the configuration data CO as a part of the association acknowledged response.

Alternatively, if the association procedure comprises more communications than the association request and the association acknowledged response as above has been explained, the configuration data request RE may be included as a part of the association request or other message belonging to the association procedure and, correspondingly, the configuration data CO may be included as a part of the association acknowledged response or other response message belonging to the the completion of the association procedure. This also concerns other association procedures explained later on.

Figure 3C:
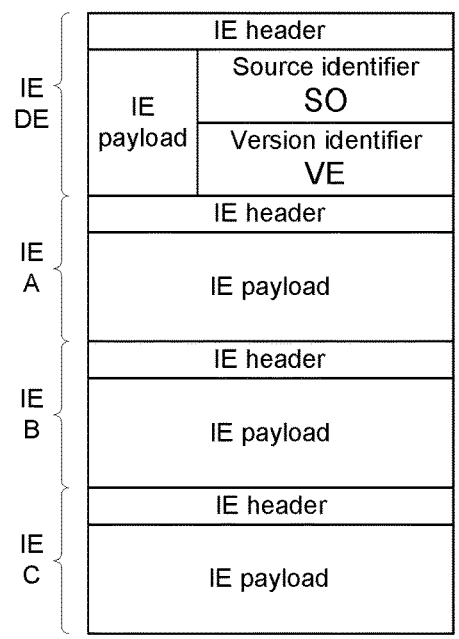

FIG. 3C presents the example format of a structure of information elements IE for the configuration data content CO, which is included in the dedicated response message or the response message belonging to the completion of the association procedure in this and following relevant method steps.

The structure comprises a plurality of information elements IE. One of the information element IE is dedicated to the configuration data description DE and it has similar options for the fields as above has been explained. Rest of the information elements IE are payload information elements IE and each of these payload information elements IE comprises a header field, which identifies a type of the information element, in this case a content and format of the payload, and a payload field, which comprises an actual data content of the configuration data CO for specific use A, B, C inside a receiver device 104.

Then, the sink device 104*a* sends, by means of its radio communicator 436, the response message, which has been generated at step 220, to the device 104*b* in order to send the actual content of the configuration data CO and, when the content of the configuration data CO has been included in the association acknowledged response, in order to complete the association of the device 104*b* to the network 102 (between the devices 104*a*, 104*b*).

Additionally, at step 220, the device 104*b* receives, by means of its radio communicator 436, the response message, which comprises the actual content of the configuration data CO in any case from the sink device 104*a*.

If the size of the information elements IE of the configuration data description DE and the payload, which a sender device 104 needs to include in the response message, may be larger than a maximum payload size of a used communication protocol stack, a sender device 104 segments (fragments) and re-assembles the response message so that the content of the configuration data CO is sent by means of multiple response messages to the receiver device 104 and the receiver device 104 needs to send a status message after a reception of each segmented response message.

When the segmentation of the response message is necessary, the sender device 104 sends a first segmented response message comprising a segmentation information element IE, which indicates to the receiver device 104 that the content of configuration data CO is sent in following segmented response messages. After the reception of the first segmented response message, the receiver device 104 sends a request message comprising a segmentation status information element IE, which indicates that the receiver device 104 has received the segmentation indication, in order to request next segmented response message, which comprises a first part of the content of configuration data CO.

Then, the sender device 104 sends a second segmented response message comprising the first part of the content of configuration data CO, an indication that this is the first part of the content of configuration data CO, and how many following parts of the content of configuration data CO the sender device 104 yet sends. After the reception of the first part of the content of configuration data CO, the receiver device 104 sends a second request message, which indicates that it has received the first part of the content of configuration data CO.

The exchange of the segment response and request messages continues as long as the sender device 104 has sent a last segmented response message comprising a last part of the content of configuration data CO and indication that it is the last part, and the receiver device 104 has received all parts of the segmented content of configuration data CO.

The exchange of the segment response and request messages makes sure that all segmented response message has been received and none is missed.

At step 222, irrespective of the used message format, the device 104b, which is now a part of the network 102 at the latest, identifies, by means of its controller 430, whether the content of the received configuration data CO comprises completely, partly, or none relevant payload(s) for it. Since the device 104b operates as a router device, it stores, by means of its controller 430, all content of the received configuration data CO in its memory 434 so that it can distribute the stored configuration data CO on request. If the device 104b would have been operated as a non-router device, it would store only the relevant payload(s), if such exists. Alternatively, even if the device 104b would have been operated as a non-router device, it may store all content of the received configuration data CO. Then, the device 104b adopts, by means of its controller 430, the identified relevant payload(s) of the received configuration data CO, if such exists, similarly as the sink device 104a at step 212.

At step 224, the device 104b generates, by means of its controller 430, the configuration data description DE, which comprises the stored version identifier VE and, if such exists, the stored source identifier SO. Additionally, the device 104a includes, by means of its controller 430, the configuration data description DE as a part of a beacon message similarly as the sink device 104a at step 212.

Then, at step 224, the device 104b broadcasts, by means of its radio communicator 436, the beacon message comprising the configuration data description DE periodically in order to inform that the stored configuration data CO is available on request and, at the same time when necessary, in order to initiate an association with other device 104, 104c, 104d on request similarly as the sink device 104a at step 212.

The (second) device 104c, which operates as a non-router device in this example, receives, by means of its radio communicator 436, the broadcasted beacon message similarly as the device 104b at step 214. The device 104c may also operate as a router device. The configuration data description DE may also be received by other devices 104. Again, in both cases, each receiver device 104, 104c, which is a non-router device, operates independently and similarly in accordance with the following communication between the devices 104b, 104c and each receiver device 104, 104c, which is a router device, operates independently and similarly in accordance with the above explained communication between the devices 104a, 104b.

Then, at step 224, the device 104c identifies, by means of its controller 430, whether the device 104c lacks a version identifier VE or the stored version identifier VE differs from the version identifier VE in the beacon message. Additionally, if the beacon message comprises the source identifier SO, the device 104c also identifies, by means of its controller 430, whether the device 104c lacks a stored source identifier SO or the stored source identifier SO differs from the source identifier SO in the beacon message. The identification is performed similarly as the device 104b at step 215.

If the identification indicates that the version identifier VE is unchanged or both identifiers VE, SO, when the beacon message comprises the source identifier SO, are unchanged, the device 104c has no need to update its configuration data and it continues to operate as previously.

If the version identifier VE is changed or missing, or at least one of the identifiers VE, SO, when the beacon message comprises the source identifier SO, is changed or missing, the method 208 continues at step 225 or at step 227 depending on whether the device 104c is a part of the network 102 or not, and whether the configuration data distribution is included in the association communication or not.

At step 225, if the device 104c is not a part of the network 102 and the association and distribution communications are separate, the device 104c generates, by means of its controller 430, the association request in order to request the association to the network 102 from the device 104b and sends, by means of its radio communicator 436, the association request to the device 104b. Then, the device 104b receives, by means of its radio communicator 436, the association request.

At step 226, the device 104b generates, by means of its controller 430, an association acknowledged response and sends, by means of its radio communicator 436, the generated response to the device 104c in order to complete the association between the devices 104b, 104c.

At step 227, if the device 104c is already a part of the network 102, the device 104c, which lacks the configuration data CO, has the old version of the configuration data CO, or has different source identifier SO, generates, by means of its controller 430, a configuration data request RE in order to request the actual content of the available configuration data CO from the device 104b similarly as the device 104b at step 218. Alternatively, if the configuration data distribution may be included in the association communication and the device 104c is not yet a part of the network 102, the device 104c may include, by means of its controller 430, the generated configuration data request RE as a part of the association request.

Then, the device 104c sends, by means of its radio communicator 436, the request message, which has been generated at step 227, to the device 104b similarly as the device 104a at step 218.

At step 227, the device 104b receives, by means of its radio communicator 436, the configuration data request RE or the association request, which comprises the configuration data request RE, from the device 104*c* similarly as the sink device 104*a* at step 220.

If the device 104*b* received the configuration data request RE, it generates, by means of its controller 430, a message comprising the content of the configuration data CO in order to send the actual content of the configuration data CO to the device 104*c*. Alternatively, if the device 104*b* received the association request, it includes, by means of its controller 430, the content of the configuration data CO as a part of the association acknowledged response similarly as the sink device 104*a* at step 220. In both cases, the device 104*b* sends the content of the configuration data CO to the device 104*c* independently without requesting the content of the configuration data CO from the sink device 104*a* any more.

Then, at step 228, the device 104*b* sends, by means of its radio communicator 436, the response message, which has been generated at step 227, to the device 104*c* in order to send the actual content of the configuration data CO and, when the content of the configuration data CO has been included in the association acknowledged response, in order to complete the association between the devices 104*b*, 104*c* similarly as the sink device 104*a* at step 220.

Additionally, at step 228, the device 104*c* receives, by means of its radio communicator 436, the response message, which comprises the actual content of the configuration data CO in any case from the device 104*b*. Alternatively, if necessary, the actual content of the configuration data CO may be communicated by the exchange of segmented response and request messages as above has been explained.

The device 104*c*, which is now a part of the network 102 at the latest, at least identifies, by means of its controller 430, whether the content of the received configuration data CO comprises a relevant payload(s) for it and stores, by means of its controller 430, the identified relevant payload(s) of the received configuration data CO, if such exists, in its memory 434. Alternatively, the device 104*c* stores, by means of its controller 430, all content of the received configuration data CO similarly as the device 104*b* at step 222. Then, the device 104*c* adopts, by means of its controller 430, the identified relevant payload(s) of the received configuration data CO.

The device 104*c* may change its role as a router device and, if it has already stored all content of the configuration data CO, the device 104*c* may generate, by means of its controller 430, a configuration data description DE and broadcast, by means of its radio communicator 430, the beacon message comprising the configuration data description DE similarly as the device 104*b* at step 224.

If the device 104*c* has already operated as a router device when it received the configuration data description DE at step 224, the router device 104*c*, which has stored all content of the received configuration data CO as above has been explained, may generate the configuration data description DE and broadcast the beacon message comprising the configuration data description DE similarly as the device 104*b* at step 224.

In both cases, irrespective of whether the device 104*c* has changed its role as a router device or it has already operated as a router device, the device 104*c* may send the stored content of the configuration data CO to another device 104, which has sent the configuration data request RE to the device 104*c*, independently without requesting the content of the configuration data CO from the device 104*b* any more.

Alternatively, if the device 104*c*, which has operated as a non-router device, has not the stored all content of the configuration data CO and other device 104 requests the configuration data CO by the configuration data request RE from it, the device 104*c* generates, by means of its controller 430, the configuration data request RE in order to request the content of the configuration data CO from the device 104*b* similarly as at step 227. The device 104*b* sends the stored content of the configuration data CO as a response to the device 104*c* similarly as at step 228 and the device 104*c* stores all received content of the configuration data CO. Then, the device 104*c* sends, by means of its controller 430, the stored content of the configuration data CO to the requesting device 104.

Figure 2B:
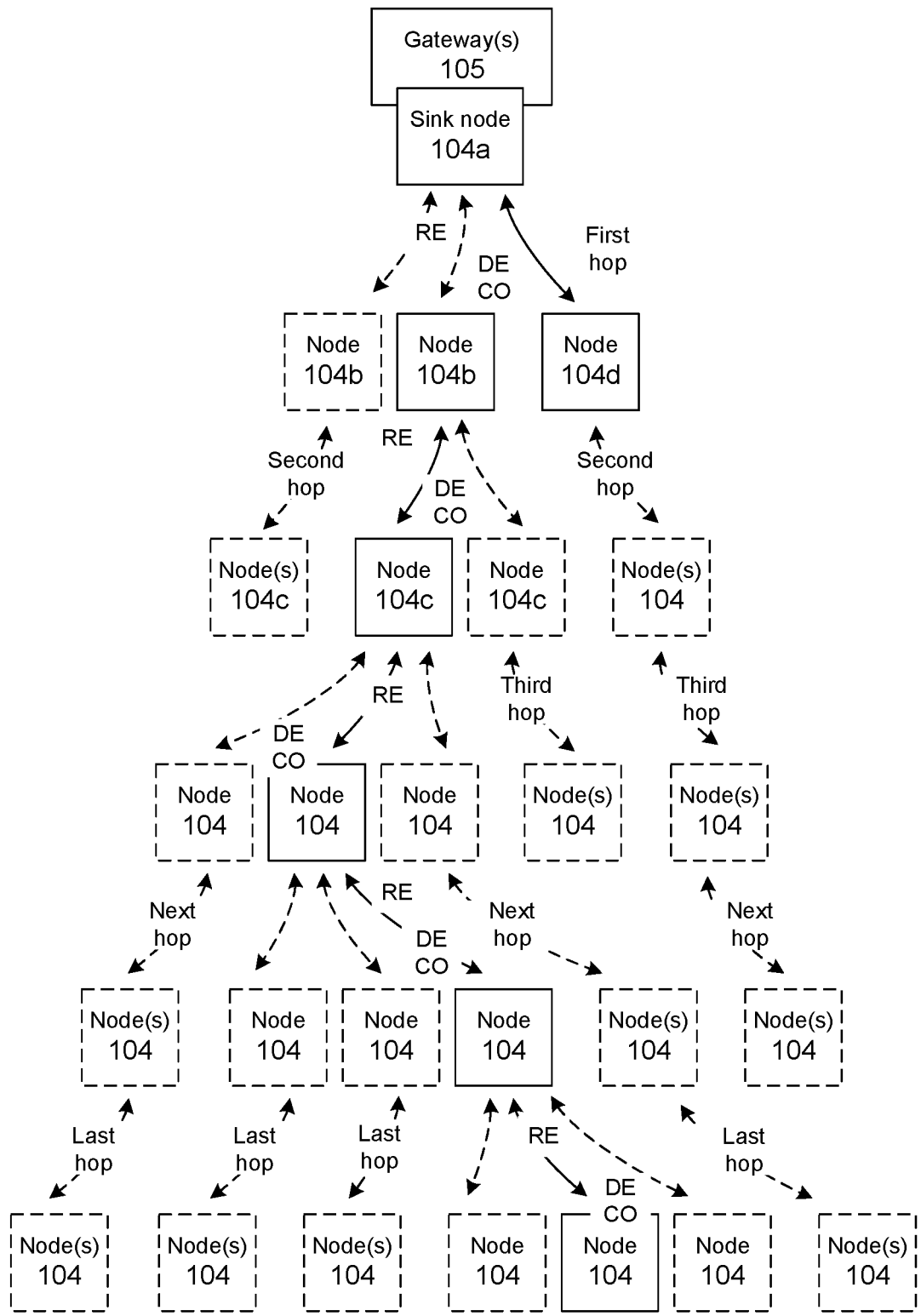

FIG. 2B presents the principle of the multi-hop communication. Even if the above explanation is made by mainly referring to the devices 104*a*, 104*b*, 104*c*, each message, e.g. the configuration data description DE, broadcasted by single device 104*a* may be received by a plurality of node devices including the device 104*b*. So, the device 104*b* comprises at least one node device, e.g. one, two, three, four, or more node devices, and each communicates independently and similarly with the device 104*a* in accordance with a mesh network principle even if it is explained that the communication is performed between the device 104*a* and single device 104*b*.

The same concerns also each message broadcasted by single device 104*b*, which may be received by a plurality of node devices including the device 104*c*, and a communication between the device 104*b* and single device 104*c*. This means that the device 104*c* also comprises at least one node device, e.g. one, two, three, four, or more node devices and the device 104*b* may communicate with a plurality of node devices by independent communication with each of said node devices. Naturally, the same also concerns each message broadcasted by single device 104*c* which may be received by a plurality of node devices including other devices 104, and a communication between the device 104*c* and single other device 104.

Correspondingly, the same concerns also each message broadcasted by single other device(s) 104, which may be received by a plurality of node devices including second other devices 104, and a communication between the other device 104 and single second other device 104. Then, each second other device 104 continues an automatic dissemination of each message through the network 102 in accordance with the multihop principle.

Figure 4:
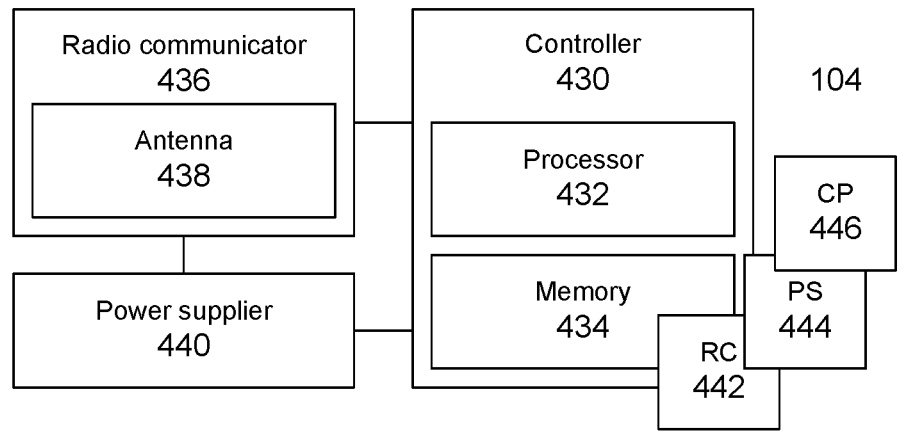
FIG. 4 presents operational parts of a wireless radio communication device

FIG. 4 presents a device 104 (104*a*, 104*b*, 104*c*, 104*d*) that is able to communicate in the network 102 and to perform the relevant features (steps) of configuration method 208 as above has been explained.

The device 104 comprises the controller (control part) 430 that controls operations of its parts 432, 434, 436, 438, 440 so that the device 104 operates as above has been explained.

The controller 430 comprises a processor (processor part) 432 that performs operator-initiated and/or computer program-initiated instructions, and processes data in order to run applications. The processor 432 may comprise at least one processor, e.g. one, two, three, four, or more processors.

The controller 430 also comprises the memory (memory part) 434 in order to store and to maintain data. The data may be instructions, computer programs, and data files. The memory 434 comprises at least one memory, e.g. one, two, three, four, or more memories.

The device 104 also comprises the radio communicator (radio communication part, data transferer) 436 and an antenna (antenna part) 438 that the controller 430 uses in order to send commands, requests, and data to at least one of entities in the system 100, e.g. devices 104, via the antenna 438. The radio communicator 436 also receives commands, requests, and data from at least one of entities in the system 100, e.g. devices 104, via the antenna 438. The communication between the radio communicator 436 of the device 104 and other entities in the system 100 is provided through the antenna 438 wirelessly.

The device 104 also comprises a power supplier (power supply part) 440. The power supplier 440 comprises components for powering the device 104, e.g. a battery and a regulator.

The memory 434 stores at least a radio communication application 442 for operating (controlling) the radio communicator 436, and a power supply application 444 for operating the power supplier 440.

The memory 434 also stores a computer program (computer software, computer application) 448, which uses at least one of parts 436, 438, 440 in order to perform at least the operations of the device 104 explained above in context of the previous figures, when it is executed (run) in a computer, e.g. in the device 104, by means of the controller 430.

The computer program 448 may be stored in a tangible, non-volatile computer-readable storage medium, e.g. a Compact Disc (CD) or Universal Serial Bus (USB)-type storage device.

The invention claimed is:

1. A configuration system for a wireless communication network, comprising:
    at least one first communication device; and
    at least one second communication device;
    wherein the at least one first and second communication devices belong to a plurality of communication devices;
    wherein each communication device in the plurality of the communication devices is a radio node device configured to provide a bi-directional radio communication with at least one of the plurality of the communication devices; and
    wherein, after receiving a content of a network persistent configuration data (CO) from a communication device belonging to the plurality of the communication devices and storing the received content of the configuration data, each first communication device is configured to broadcast a configuration data description (DE), which comprises a version identifier (VE) of the configuration data, periodically in the network for indicating a capability of said first communication device to send the stored content of the configuration data, which is in accordance with the version identifier, on request.

2. The system according to claim 1, wherein, before receiving the content of configuration data from the communication device, the at least one first communication device is configured to receive the broadcasted configuration data description from the communication device.

3. The system according to claim 1, wherein the communication device is a sink device and, after receiving the content of the configuration data from outside the network, the sink device is configured to store the received content of the configuration data and to operate as a source of the configuration data in the network.

4. The system according to claim 3, wherein the sink device belongs to a plurality of sink devices in the network so that the sink device and at least one other sink device from the plurality of sink devices operate as sources of the configuration data.

5. The system according to claim 3, wherein, after receiving a content of another network persistent configuration data (CO) from outside the network and storing the received content of the another configuration data, each sink device is configured to broadcast another configuration data description (DE), which comprises a version identifier (VE) of the another configuration data, periodically in the network for indicating a capability of said sink device to send the stored content of the another configuration data, which differs from the content of the configuration data, on request from at least one of the plurality of communication devices.

6. The system according to claim 1, wherein the at least one second communication device is configured to receive the broadcasted configuration data description from one of the at least one first communication device.

7. The system according to claim 1, wherein, after receiving the configuration data description, the at least one first communication device or the at least one second communication device is configured to identify whether the version identifier or a source identifier (SO) of the configuration data, if the source identifier exists in the configuration data description, is missing or whether the version identifier or the source identifier, if the source identifier exists in the configuration data description, has changed.

8. The system according to claim 1, wherein the at least one first communication device is configured to send a network persistent configuration data request (RE) to the communication device or the at least one second communication device is configured to send the configuration data request to one of the at least one first communication device after the identification has indicated that the version identifier or the source identifier of the configuration data, if the source identifier exists in the received configuration data description, is missing or that the version identifier or the source identifier, if the source identifier exists in the received configuration data description, has changed.

9. The system according to claim 1, wherein the at least one first or second communication device is configured to send a configuration data request (RE) as a part of a message belonging to an association procedure in pursuance of an association to the network.

10. The system according to claim 8, wherein, when the at least one first communication device has sent the configuration data request, the communication device is configured to send to the at least one first communication device or, when the at least one second communication device has sent the configuration data request, the at least one first communication device is configured to send to the second device, the configuration data content as a part of a response message belonging to the association procedure in pursuance of a completion of the association to the network.

11. The system according to claim 1, wherein, after receiving the content of the configuration data from the one of the at least one first communication device and storing the received content of the configuration data, each second communication device is configured to broadcast a configuration data description (DE) periodically in the network for indicating a capability of said second communication device to send the stored content of the configuration data on request.

12. The system according to claim 1, wherein the network is Digital European Cordless Telecommunication 2020-based network, a wireless multihop network, a wireless mesh network, a wireless local area network, a cellular based local area network, a low power wide area network, a cellular network, a wireless Bluetooth Low Energy-based radio network, Zigbee network, Thread network, or Public Land Mobile Network.

13. The system according to claim 1, wherein the configuration data comprises Internet Protocol version 6 configuration information; IPv6 over Low-Power Wireless Personal Area Network configuration information; Dynamic Host Configuration Protocol information; Domain Name System information; at least one of service and server information; at least one public key or digital certificate; at least one of software update control information, at least one software image, and software related metadata; at least one of at least one security key, at least one security key list, and security key related metadata; or other configuration information configured to be used by a communication device-related communication protocol, communication device-related application, or other internal communication device-related component.

14. A configuration method for a wireless communication network, comprising following steps of:
  presenting at least one first communication device and at least one second communication device belonging to a plurality of communication devices operating as radio node devices;
  providing, by each communication device in the plurality of the communication devices, a bi-directional radio communication with at least one of the plurality of the communication devices; and
  after receiving a content of a network persistent configuration data (CO) from a communication device belonging to the plurality of the communication devices and storing the received content of the configuration data, broadcasting, by each first communication device, a configuration data description (DE), which comprises a version identifier (VE) of the configuration data, periodically in the network for indicating a capability of said first communication device to send the stored content of the configuration data, which is in accordance with the version identifier, on request.

15. A wireless communication device for distributing a configuration data (CO) in a wireless communication network, comprising:
  a controller; and
  a radio communicator for operating as a radio node device;
  wherein the radio communicator is configured to provide a bi-directional radio communication with at least one of a plurality of communication devices; and
  wherein, after receiving a content of a network persistent configuration data (CO) from another communication device belonging to the plurality of communication devices and storing the received content of the configuration data, the radio communicator is configured to broadcast a configuration data description (DE), which comprises a version identifier (VE) of the configuration data, periodically in the network for indicating a capability of said communication device to send the stored content of the configuration data, which is in accordance with the version identifier, on request.

16. A configuration method for distributing a configuration data in a wireless communication network, comprising following steps of:
  providing, by a radio communicator of a wireless communication device operating as a radio node device, a bi-directional radio communication with at least one of a plurality of communication devices; and
  after receiving a content of a network persistent configuration data (CO) from another communication device belonging to the plurality of communication devices and storing the received content of the configuration data, broadcasting, by the radio communicator, a configuration data description (DE), which comprises a version identifier (VE) of the configuration data, periodically in the network for indicating a capability of said communication device to send the stored content of the configuration data, which is in accordance with the version identifier, on request.

17. A non-transitory computer readable medium comprising a computer program that comprises instructions, which, when the computer program is executed by a computer, cause the computer to carry out at least the steps of the configuration method according to claim 16.

* * * * *